US011979727B2

(12) United States Patent
Lee et al.

(10) Patent No.: US 11,979,727 B2
(45) Date of Patent: May 7, 2024

(54) EARPHONE MODULE

(71) Applicant: CRESYN CO., LTD., Seoul (KR)

(72) Inventors: Jong Bae Lee, Seoul (KR); Ji Sang Jeon, Seoul (KR); Jong Man Kim, Bucheon-si (KR)

(73) Assignee: CRESYN CO., LTD., Seoul (KR)

( * ) Notice: Subject to any disclaimer, the term of this patent is extended or adjusted under 35 U.S.C. 154(b) by 198 days.

(21) Appl. No.: 17/861,816

(22) Filed: Jul. 11, 2022

(65) Prior Publication Data

US 2023/0370780 A1 Nov. 16, 2023

(30) Foreign Application Priority Data

May 10, 2022 (KR) ........................ 10-2022-0057399

(51) Int. Cl.

| | |
|---|---|
| ***H04R 9/02*** | (2006.01) |
| ***H04R 1/10*** | (2006.01) |
| ***H04R 7/04*** | (2006.01) |
| ***H04R 9/04*** | (2006.01) |

(52) U.S. Cl.

CPC ........... *H04R 9/025* (2013.01); *H04R 1/1075* (2013.01); *H04R 7/04* (2013.01); *H04R 9/045* (2013.01); *H04R 9/046* (2013.01)

(58) Field of Classification Search

CPC ........ H04R 9/025; H04R 1/1075; H04R 7/04; H04R 9/045; H04R 9/046; H04R 9/063; H04R 9/06; H04R 9/02; H04R 5/02; H04R 1/00; H04R 7/16; H04R 25/48; H04R 31/00; H04R 1/24; H04R 1/06; H04R 1/1016; H04R 1/2826; H04R 7/18; H04R 2460/11; H04R 2201/028; H04R 1/10; H04R 1/345

USPC ......................... 381/191, 150, 400, 412, 420

See application file for complete search history.

(56) References Cited

U.S. PATENT DOCUMENTS

| | | | | |
|---|---|---|---|---|
| 7,386,138 | B2 * | 6/2008 | Kajiwara | H04R 9/06 381/189 |
| 11,026,012 | B1 * | 6/2021 | Ko | H04R 1/2826 |
| 11,290,825 | B1 * | 3/2022 | Ko | H04R 9/06 |
| 2020/0314550 | A1 * | 10/2020 | Kagawa | H04R 9/025 |
| 2022/0210532 | A1 * | 6/2022 | Han | H04R 9/063 |
| 2022/0312124 | A1 * | 9/2022 | Ko | H04R 9/063 |

* cited by examiner

*Primary Examiner* — Carolyn R Edwards
*Assistant Examiner* — Julie X Dang
(74) *Attorney, Agent, or Firm* — Stein IP, LLC

(57) ABSTRACT

Disclosed herein is an earphone module having a speaker capable of reproducing both high- and low-pitched sounds. In an earphone module according to the present invention, two coils and terminal members configured to be electrically connected to the two coils are provided, the two coils and the terminal members are assembled by electrically connecting the two coils and the terminal members to each other, and then the terminal members are connected to an external input circuit through the exposure window of a housing. Accordingly, the manufacturing operation is facilitated and the defect rate is reduced, so that the mass productivity is improved.

8 Claims, 14 Drawing Sheets

EARPHONE MODULE

CROSS-REFERENCE TO RELATED APPLICATION

This application claims the benefit of Korean Patent Application No. 10-2022-0057399 filed on May 10, 2022, which is hereby incorporated by reference herein in its entirety.

BACKGROUND

1. Technical Field

The present invention relates generally to an earphone module, and more particularly to an earphone module having a 2-way speaker capable of reproducing both high- and low-pitched sounds.

2. Description of the Related Art

With the development of information, communication and mobile technology, earphones accompanying a variety of types of electronic tools (smartphones, mobile game consoles, etc.) for enjoying sound content have become essential accessories.

Earphones are composed of a pair of earphone modules. Each of the earphone modules is equipped with a speaker.

Conventionally, a speaker is composed of only a single diaphragm. As the use of earphones increases, 2-way speaker products each equipped with two diaphragms are being developed to achieve further evolution and allow for richer sound listening.

Meanwhile, a speaker includes a diaphragm configured to generate sound, and an acoustic coil attached to the diaphragm and configured to vibrate. The vibration of the acoustic coil is caused by magnetic field interference with a permanent magnet. To this end, an electrical signal adapted to generate a magnetic field needs to be input to the acoustic coil. Accordingly, a circuit board configured to input an electrical signal to the acoustic coil needs to be provided. Furthermore, two coil wires drawn out from the acoustic coil need to be electrically connected to the circuit board.

An earphone module is manufactured in such a manner as to stack a variety of types of parts in a housing. One of the most difficult manufacturing tasks is to electrically connect two lead wires, drawn from each acoustic coil, to a circuit board. The lead wires are electrically connected to the circuit board by a sophisticated soldering task in a structure that can prevent the two lead wires from being disconnected during the operation of the speaker.

However, since the coil wires may be separated from the circuit board during the assembly process of the earphone module, a considerably difficult assembly process needs to be performed, which is the main cause of deterioration in mass productivity. Furthermore, since the earphone module equipped with two diaphragms requires an increase in the number of parts to be stacked and more electrical connection processes, such complexity is further increased, which ultimately further deteriorates the mass productivity.

PRIOR ART LITERATURE

Patent Document 1: U.S. Pat. No. 7,386,138B

SUMMARY

The present invention has been conceived to fulfill the following needs:

First, it is necessary to have a structure that allows the electrical connection between lead wires and an external input circuit to be stably performed in a 2-way earphone module equipped with two diaphragms within a short period of time.

Second, it is necessary to have a structure that allows the electrical connection between lead wires and an external input circuit to be performed last after the basic assembly process of a 2-way earphone module is completed.

According to a first aspect of the present invention, there is provided an earphone module including: a first permanent magnet configured to generate a first magnetic field adapted to reproduce a first sound in a high-pitched range; a first coil configured to vibrate according to interference by generating a first magnetic flux adapted to interfere with the first magnetic field formed by the first permanent magnet in response to an input first electrical signal; a first diaphragm configured to generate the first sound in the high-pitched range by vibrating together with the first coil by the vibration of the first coil; a second permanent magnet provided outside the first permanent magnet, and configured to generate a second magnetic field adapted to reproduce a second sound in a low-pitched range; a second coil configured to vibrate according to interference by generating a second magnetic flux adapted to interfere with the second magnetic field formed by the second permanent magnet in response to an input second electrical signal; a second diaphragm configured to generate the second sound in the low-pitched range by vibrating together with the second coil by the vibration of the second coil, and disposed behind the first diaphragm; a support plate configured to support the first permanent magnet and the second permanent magnet together, and made of a magnetic material to induce magnetic fluxes generated by the first permanent magnet and the second permanent magnet; a housing provided with an accommodation space for accommodating the first permanent magnet, the first coil, the first diaphragm, the second permanent magnet, the second coil, the second diaphragm, and the support plate, provided with a sound output opening in the front thereof (in a direction in which sound is emitted), and also provided with a mount opening for enabling the first permanent magnet, the first coil, the first diaphragm, the second permanent magnet, the second coil, the second diaphragm, and the support plate to be mounted by allowing them to be accommodated in the accommodating space in the rear thereof; a cover configured to cover the mount opening of the housing; a pair of first terminal members connected to both lead wires of the first coil to input an electrical signal to the first coil; and a pair of second terminal members connected to both lead wires of the second coil to input an electrical signal to the second coil; wherein the housing is provided with an exposure window for exposing the pair of first terminal members and the pair of second terminal members to the outside to connect the pair of first terminal members and the pair of second terminal members to an external electrical input circuit.

The earphone module may further include: a first support ring configured to support the support plate on the housing, and formed by injection molding; a magnetic flux inducer configured to induce the magnetic flux of the first permanent magnet; an induction plate provided outside the magnetic flux inducer, and configured to cover the rear surface of the second permanent magnet and to induce the magnetic flux of the second permanent magnet; and a second support ring configured to support the induction plate on the housing, and formed by injection molding.

The pair of first terminal members may be coupled to the first support ring; and the pair of second terminal members may be coupled to the second support ring.

The pair of first terminal members may be coupled to the first support ring by insert injection in an integrated form; and the pair of second terminal members may be coupled to the second support ring by insert injection in an integrated form.

According to a second aspect of the present invention, there is provided an earphone module including: a first permanent magnet configured to generate a first magnetic field adapted to reproduce a first sound in a high-pitched range; a first coil configured to vibrate according to interference by generating a first magnetic flux adapted to interfere with the first magnetic field formed by the first permanent magnet in response to an input first electrical signal; a first diaphragm configured to generate the first sound in the high-pitched range by vibrating together with the first coil by the vibration of the first coil; a second permanent magnet provided outside the first permanent magnet, and configured to generate a second magnetic field adapted to reproduce a second sound in a low-pitched range; a second coil configured to vibrate according to interference by generating a second magnetic flux adapted to interfere with the second magnetic field formed by the second permanent magnet in response to an input second electrical signal; a second diaphragm configured to generate the second sound in the low-pitched range by vibrating together with the second coil by the vibration of the second coil, and disposed behind the first diaphragm; a support plate configured to support the first permanent magnet and the second permanent magnet together, and made of a magnetic material to induce magnetic fluxes generated by the first permanent magnet and the second permanent magnet; a housing provided with an accommodation space for accommodating the first permanent magnet, the first coil, the first diaphragm, the second permanent magnet, the second coil, the second diaphragm, and the support plate, provided with a sound output opening in the front thereof (in a direction in which sound is emitted), and also provided with a mount opening for enabling the first permanent magnet, the first coil, the first diaphragm, the second permanent magnet, the second coil, the second diaphragm, and the support plate to be mounted by allowing them to be accommodated in the accommodating space in the rear thereof; a cover configured to cover the mount opening of the housing; and a pair of terminal members each connected to both lead wires of the corresponding one of the first coil and the second coil to input electrical signals to the first coil and the second coil; wherein the housing is provided with an exposure window for exposing the pair of terminal members to the outside so that the pair of terminal members can be connected to an external electrical input circuit.

The earphone module may further include: a magnetic flux inducer configured to induce the magnetic flux of the first permanent magnet; an induction plate provided outside the magnetic flux inducer, and configured to cover the rear surface of the second permanent magnet and to induce the magnetic flux of the second permanent magnet; and a second support ring configured to support the induction plate on the housing, and formed by injection molding.

The pair of terminal members may be coupled to the second support ring.

The pair of terminal members may be coupled to the second support ring by insert injection in an integrated form.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings. For brevity of description, descriptions of redundant configurations will be omitted or abridged as much as possible.

First Embodiment

Figure 1:
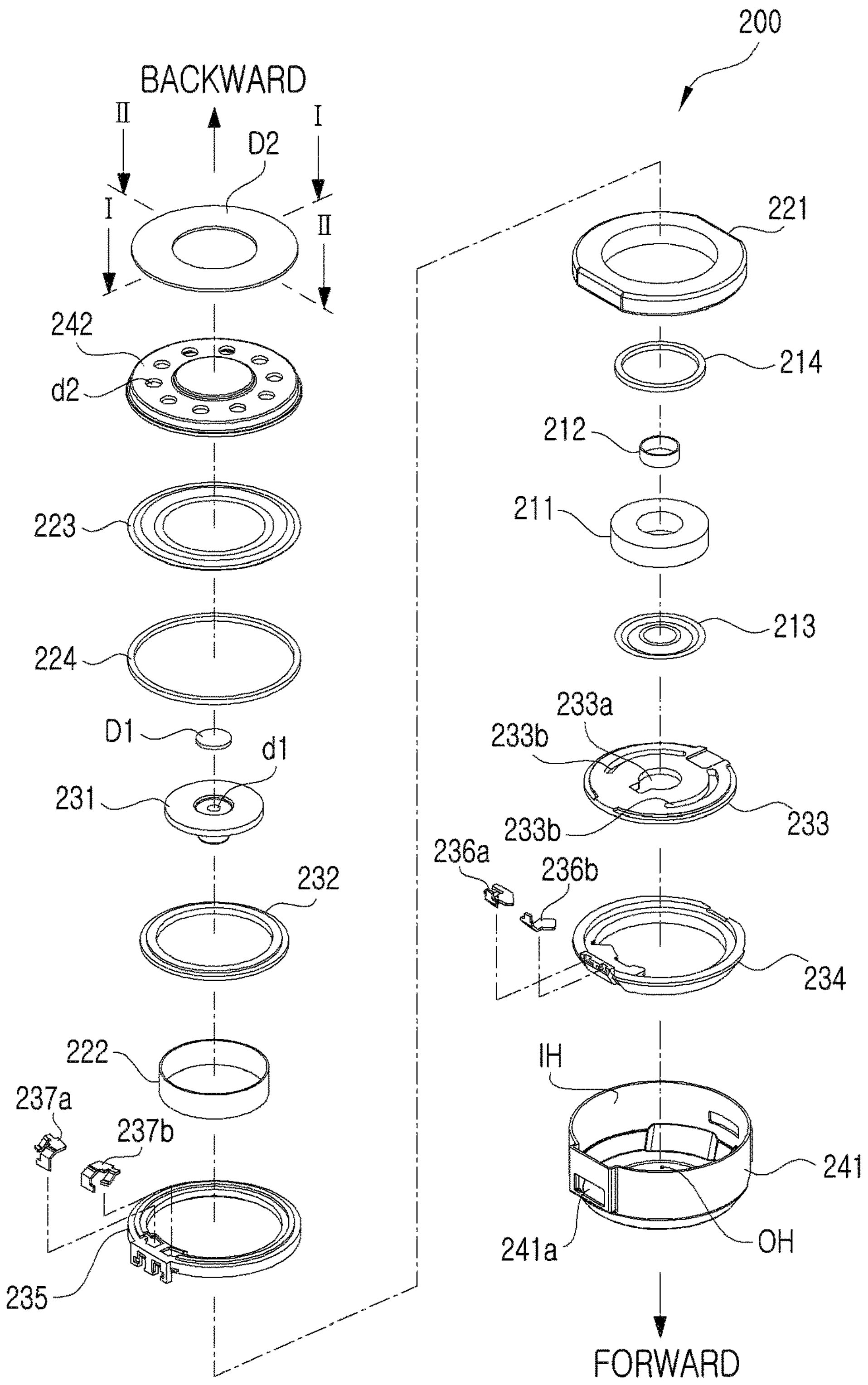
FIG. 1 is an exploded perspective view of an earphone module according to a first embodiment of the present invention.
Figure 2:
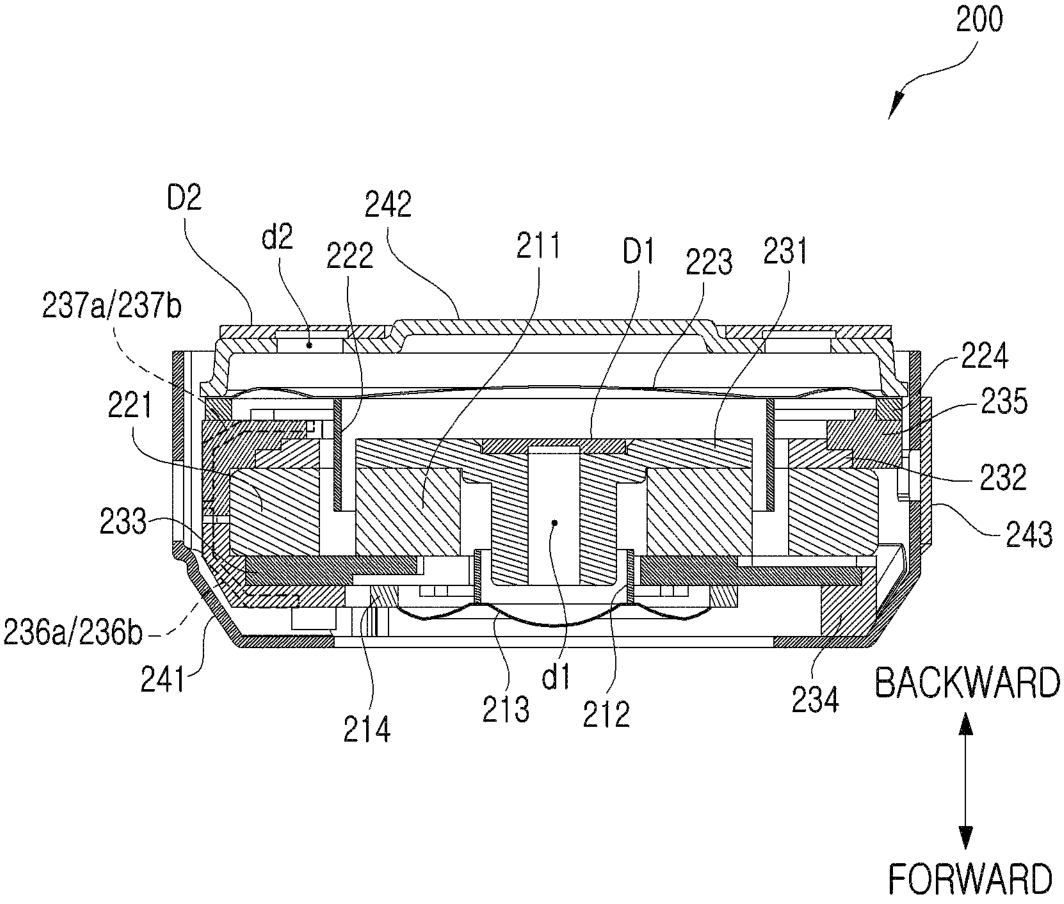
FIG. 2 is a sectional view of the earphone module taken along line I-I of FIG. 1.

FIG. 1 is an exploded perspective view of an earphone module 200 according to a first embodiment of the present invention, and FIG. 2 is a sectional view taken along line I-I of FIG. 1. For reference, in the drawings and the following description, the direction in which sound is output is defined as a forward direction, and the opposite direction is defined as a rearward direction.

The earphone module 200 according to the present embodiment includes a first permanent magnet 211, a first coil 212, a first diaphragm 213, a first fixation ring 214, a second permanent magnet 221, a second coil 222, a second diaphragm 223, a second fixation ring 224, a magnetic flux inducer 231, an induction plate 232, a support plate 233, a first support ring 234, a second support ring 235, first terminal members **236*a* and 236*b*, second terminal members 237*a* and 237*b*, a housing 241, and a cover 242**.

The first permanent magnet 211 generates a first magnetic field adapted to reproduce a first sound in a high-pitched range. The first permanent magnet 211 has a ring shape with a hole in the center thereof.

The first coil 212 has a solenoid shape, and vibrates according to interference by generating a first magnetic flux adapted to interfere with the first magnetic field formed by the first permanent magnet 211 in response to an input first electrical signal. The first coil 212 is disposed between the first permanent magnet 211 and the magnetic flux inducer 231.

The first diaphragm 213 generates the first sound in the high-pitched range by vibrating together with the first coil 212 by the vibration of the first coil 212. When viewed through a plane from a rear position to a front position, the first diaphragm 213 has a disk shape.

The first fixation ring 214 is provided to fix the edge of the first diaphragm 213 to the support plate 233.

The second permanent magnet 221 generates a second magnetic field adapted to reproduce a second sound in a low-pitched range, and is provided outside the first permanent magnet 211. This second permanent magnet 221 also has a ring shape with a hole in the center thereof, and the first permanent magnet 211 is disposed in the hole to be spaced apart from the inner circumference of the hole. Furthermore, the space between the first permanent magnet 211 and the second permanent magnet 221 acts as a passage through which a low-pitched sound passes.

The second coil 222 vibrates according to interference by generating a second magnetic flux adapted to interfere with the second magnetic field formed by the second permanent magnet 221 in response to an input second electrical signal. The second coil 222 is disposed between the first permanent magnet 211 and the second permanent magnet 221. In the present embodiment, the second electrical signal and the first electrical signal are scheduled to be the same electrical signals. It is obvious that depending on implementation, the second electrical signal may be different from the first electrical signal.

The second diaphragm 223 generates the second sound in the low-pitched range by vibrating together with the second coil 222 by the vibration of the second coil 222. The second diaphragm 223 also has a disk shape when viewed through a plane from a rear position to a front position.

The second fixation ring 224 is provided to fix the edge of the second diaphragm 223 to the induction plate 232. It is obvious that since the induction plate 232 comes into contact with and is supported on the housing 241, the second diaphragm 223 is ultimately supported on the housing 241 through the second fixation ring 224 and the induction plate 232.

The magnetic flux conductor 231 has an approximately 'T' shape when viewed from the front, and covers the rear surface of the first permanent magnet 211. The forward-protruding portion of the magnetic flux conductor 231 is inserted into a hole in the center of the first permanent magnet 211. A first damping hole d1 configured to adjust sound pressure behind the first diaphragm 213 is formed to pass through the center of the protruding portion in a front-rear direction, and a first damper D1 is provided behind the first damping hole d1. This magnetic flux inducer 231 induces the first magnetic flux that is generated by the first permanent magnet 211.

The induction plate 232 is provided outside the magnetic flux inducer 231, covers the rear surface of the second permanent magnet 221, and induces the second magnetic flux generated by the second permanent magnet 221.

Figure 3:
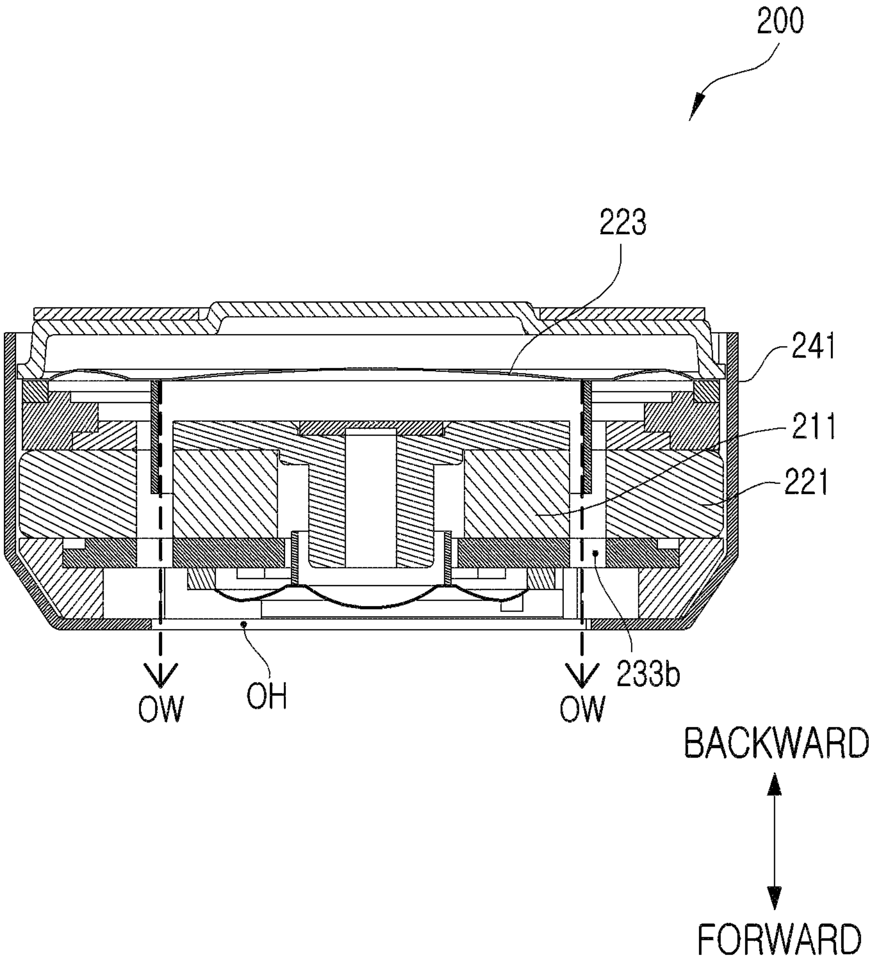
FIG. 3 is a sectional view of the earphone module taken along line II-II of FIG. 1.

The support plate 233 covers and supports the front surfaces of the first permanent magnet 211 and the second permanent magnet 221 together, and induces the first and second magnetic fluxes generated from the first permanent magnet 211 and the second permanent magnet 221. A vibration hole 233*a* is formed in the center of the support plate 233 to provide a space in which the first coil 212 can vibrate. In addition, two passage holes 233*b* through which the sound generated by the second vibration plate 223 can be passed and output forward are formed outside the vibration hole 233*a* to be symmetrically spaced apart from each other. Accordingly, as shown in the sectional view of FIG. 3 taken along line II-II of FIG. 1, output paths OW through which the second sound generated from the second diaphragm 223 is passed through the space between the first permanent magnet 211 and the second permanent magnet 221, passed through the through hole 233*b*, and then output through the sound output opening OH of the housing 241 are formed as substantially straight lines. Therefore, the phase difference between the first sound and the second sound may be minimized.

Meanwhile, the above-described magnetic flux inducer 231, induction plate 232, and support plate 233 serve to focus magnetic fluxes into the first coil 212 and the second coil 222 by inducing the magnetic fluxes of the first permanent magnet 211 and the second permanent magnet 221. To this end, all of the magnetic flux inducer 231, the induction plate 232, and the support plate 233 are made of a magnetic material.

Figure 4:
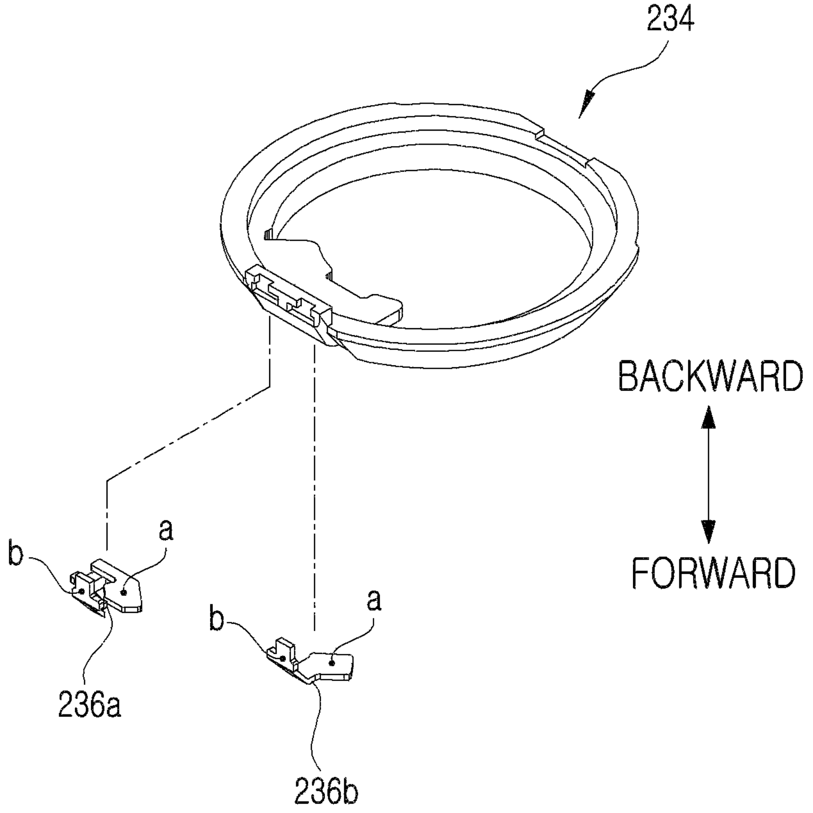
FIG. 4 is an excerpt view of a first support ring and first terminal members applied to the earphone module of FIG. 1.
Figure 5:
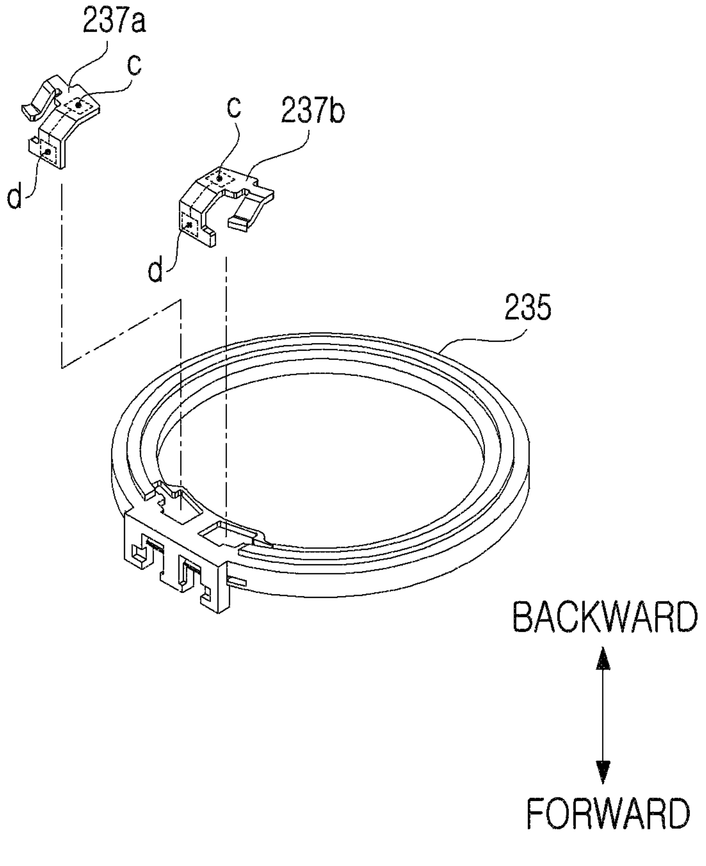
FIG. 5 is an excerpt view of a second support ring and second terminal members applied to the earphone module of FIG. 1.

The first support ring 234 shown in the excerpt view of FIG. 4 is provided to support the support plate 233 on the housing, and the second support ring 235 shown in the excerpt view of FIG. 5 is provided to support the induction plate 232 on the housing 241.

Figure 6:
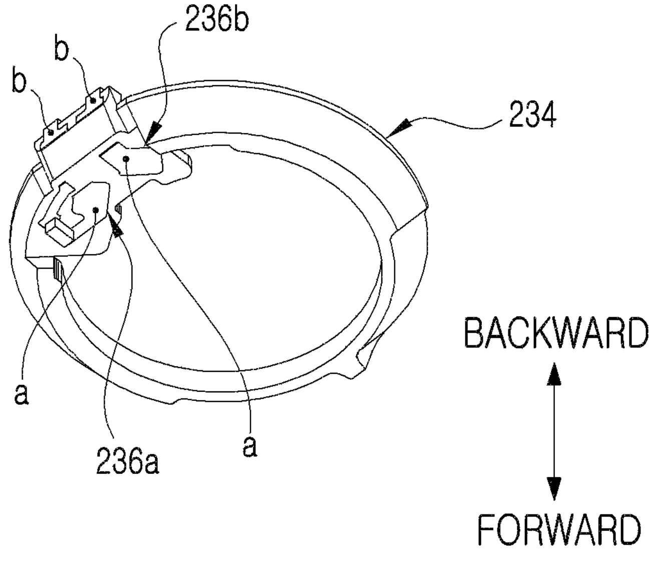
FIG. 6 is an assembled perspective view of the first support ring and the first terminal members applied to the earphone module of FIG. 1.
Figure 7:
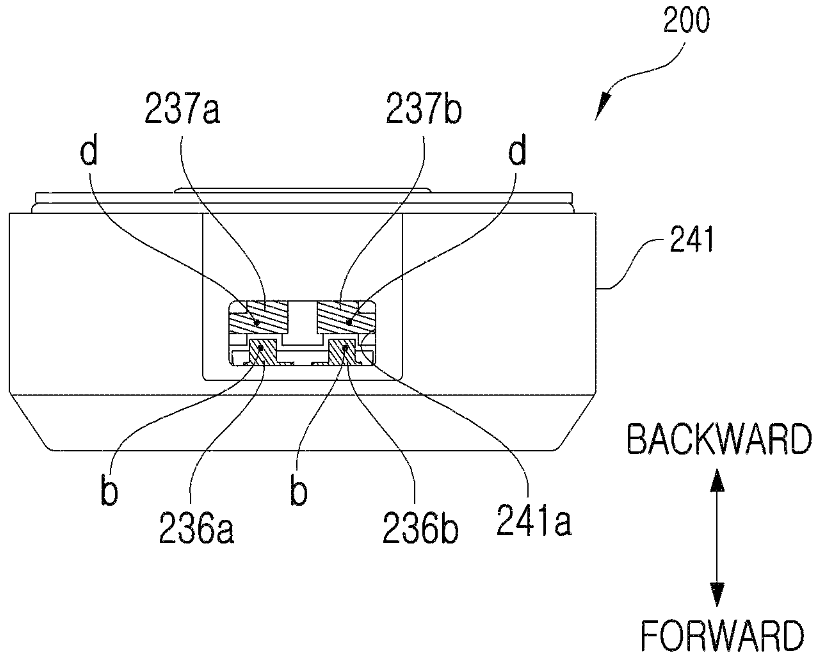
FIG. 7 is a reference view illustrating an arrangement relationship among the first terminal members, the second terminal members, and the exposure window of a housing in the earphone module of FIG. 1.

The first terminal members 236*a* and 236*b* are provided as a pair of first terminal members, and are respectively electrically connected to two coil wires drawn out from the first coil 212. These first terminal members 236*a* and 236*b* are preferably provided to be embedded in the first support ring 234, as shown in FIG. 6. To this end, the first support ring 234 is molded through injection with the first terminal members 236*a* and 236*b* are inserted thereinto. The first terminal members 236*a* and 236*b* have approximate shapes bent at the centers thereof. The front ends 'a' of the first terminal members 236*a* and 236*b* come into electrical contact with the first coil 212, and the side ends b' of the first terminal members 236*a* and 236*b* are disposed to be exposed to the outside through the exposure window 241*a* of the housing 241 as shown in FIG. 7.

Figure 8:
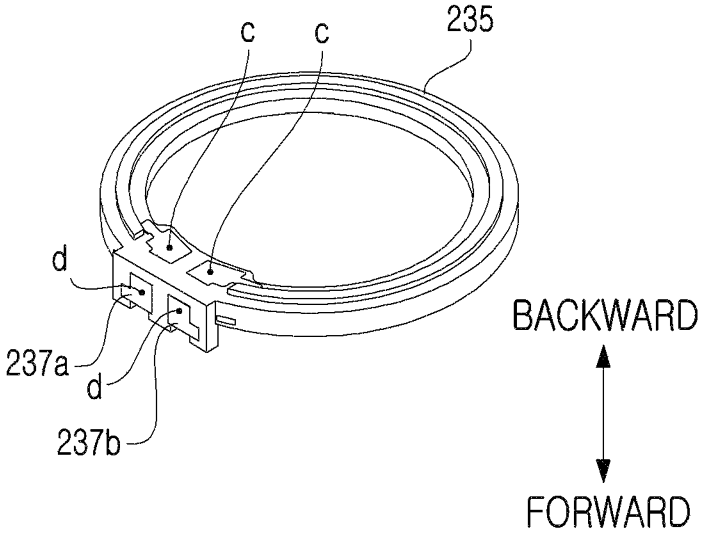
FIG. 8 is an assembled perspective view of the second support ring and the second terminal members applied to the earphone module of FIG. 1.

Also, the second terminal members 237*a* and 237*b* are provided as a pair of second terminal members, and are respectively electrically connected to two coil wires drawn out from the second coil 222. It is preferable that these second terminal members 237*a* and 237*b* are also provided in the second support ring 235 through insert injection in an integrated form, as shown in FIG. 8. In the same manner, the second terminal members 237*a* and 237*b* also have approximate shapes bent at the centers thereof. The rear ends 'c' of the second terminal members 237*a* and 237*b* come into electrical contact with the second coil 222, and the side ends 'd' of the second terminal members 237*a* and 237*b* are disposed to be exposed to the outside through the exposure window 241*a* of the housing 241 as shown in FIG. 7. In other words, the side ends 'b' of the first terminal members 236*a* and 236*b* and the side ends 'd' of the second terminal members 237*a* and 237*b* are spaced apart from each other but are disposed adjacent to each other, and are disposed to be exposed to the outside together through the exposure window 241*a*.

The housing 241 has an accommodating space configured to accommodate all of the above-described components. The sound output opening OH through which the first and second sounds generated by the first diaphragm 213 and the second diaphragm 223 are output may be formed in the front of the housing 241, and a mount opening IH which enables the above-described components to be mounted inside the accommodation space may be formed in the rear of the housing 241. Furthermore, the exposure window 241*a* configured to expose the side ends 'b' of the first terminal members 236*a* and 236*b* and the side ends 'c' of the second terminal members 237*a* and 237*b* is formed in one side of the housing 241.

The cover 242 covers the mount opening IH of the housing 241. Second damping holes d2 configured to adjust sound pressure formed behind the second diaphragm 223 are also formed in the cover 242. A second damper D2 is attached to the rear surface of the cover 242.

When the assembly of the basic components of the earphone module 200 having the above-described basic configuration is completed, the operation of connecting to an external input circuit through the exposure window 241*a* is performed. In this case, the connection operation is the operation of connecting the external input circuit with the side ends 'b' of the first terminal members 236*a* and 236*b* and the side ends 'd' of the second terminal members 237*a* and 237*b*. In other words, when the external input circuit is electrically connected to the first terminal members 236*a* and 236*b* and the second terminal members 237*a* and 237*b* through the exposure window 241*a*, the operation of electrical connection between the first terminal members 236*a* and 236*b* and the second terminal members 237*a* and 237*b* is also performed in parallel.

Second Embodiment

Figure 9:
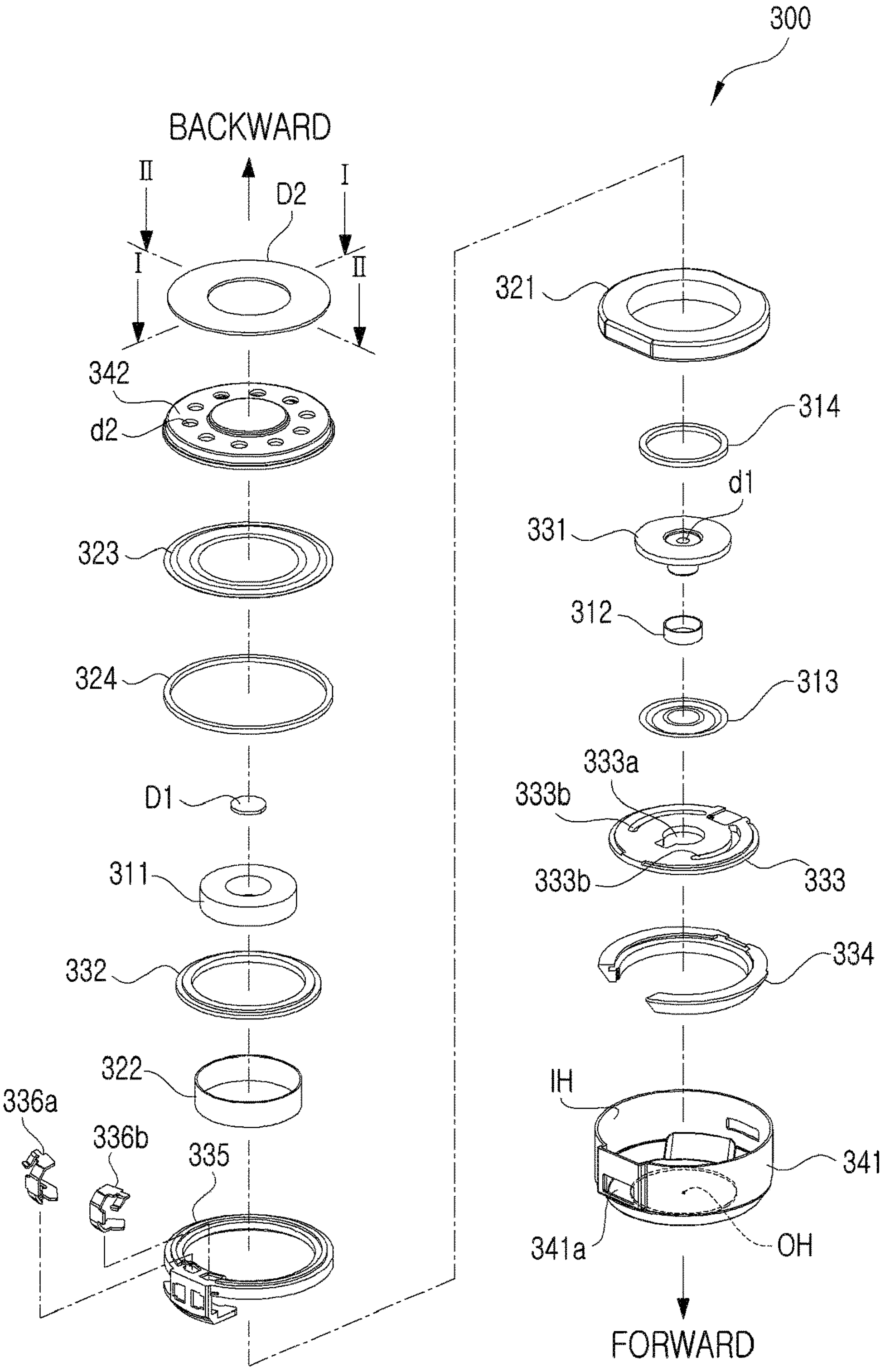
FIG. 9 is an exploded perspective view of an earphone module according to a second embodiment of the present invention.
Figure 10:
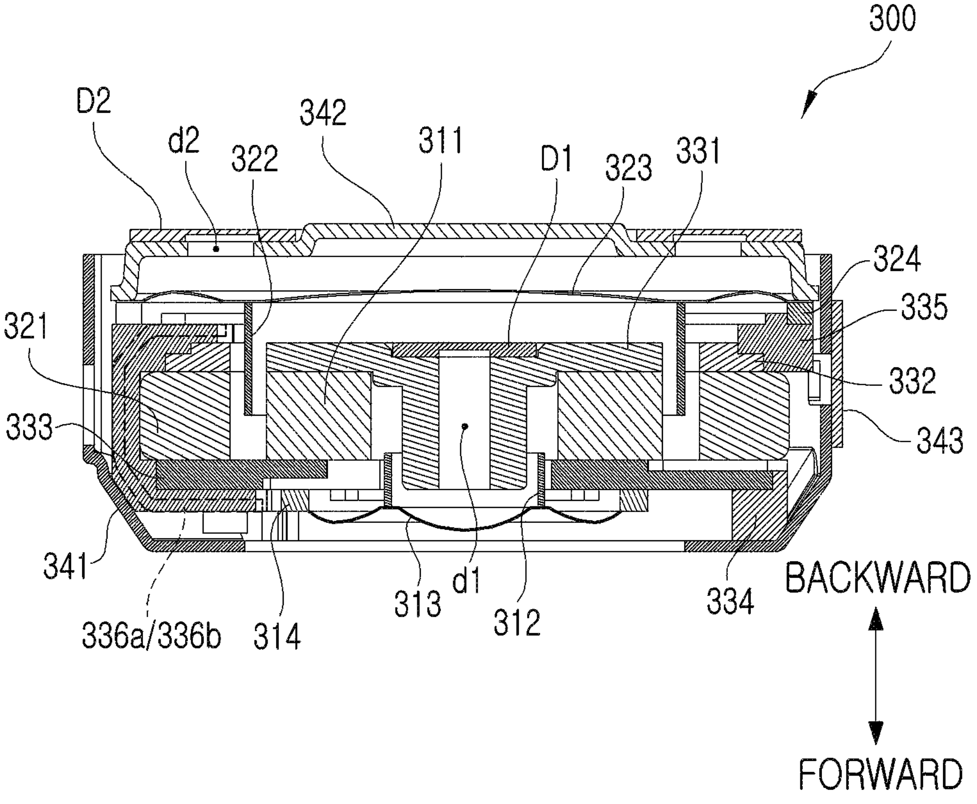
FIG. 10 is a sectional view of the earphone module taken along line I-I of FIG. 9.

FIG. 9 is an exploded perspective view of an earphone module 300 according to a second embodiment of the present invention, and FIG. 10 is a sectional view taken along line I-I of FIG. 9. In the present embodiment, the definitions of the directions are the same as in the first embodiment.

The earphone module 300 according to the present embodiment includes a first permanent magnet 311, a first coil 312, a first diaphragm 313, a first fixation ring 314, a second permanent magnet 321, a second coil 322, a second diaphragm 323, a second fixation ring 324, a magnetic flux inducer 331, an induction plate 332, a support plate 333, a first support ring 334, a second support ring 335, terminal members 336*a* and 336*b*, a housing 341, and a cover 342.

The first permanent magnet 311 generates a first magnetic field adapted to reproduce a first sound in a high-pitched range. The first permanent magnet 311 has a ring shape with a hole in the center thereof.

The first coil 312 has a solenoid shape, and vibrates according to interference by generating a first magnetic flux adapted to interfere with the first magnetic field formed by the first permanent magnet 311 in response to an input first electrical signal. The first coil 312 is disposed between the first permanent magnet 311 and the magnetic flux inducer 331.

The first diaphragm 313 generates the first sound in the high-pitched range by vibrating together with the first coil 312 by the vibration of the first coil 312. When viewed through a plane from a rear position to a front position, the first diaphragm 313 has a disk shape.

The first fixation ring 314 is provided to fix the edge of the first diaphragm 313 to the support plate 333.

The second permanent magnet 321 generates a second magnetic field adapted to reproduce a second sound in a low-pitched range, and is provided outside the first permanent magnet 311. This second permanent magnet 321 also has a ring shape with a hole in the center thereof, and the first permanent magnet 311 is disposed in the hole to be spaced apart from the inner circumference of the hole. Furthermore, the space between the first permanent magnet 311 and the second permanent magnet 321 acts as a passage through which a low-pitched sound passes.

The second coil 322 vibrates according to interference by generating a second magnetic flux adapted to interfere with the second magnetic field formed by the second permanent magnet 321 in response to an input second electrical signal. The second coil 322 is disposed between the first permanent magnet 311 and the second permanent magnet 321. In the present embodiment, the second electrical signal and the first electrical signal are the same.

The second diaphragm 323 generates the second sound in the low-pitched range by vibrating together with the second coil 322 by the vibration of the second coil 322. The second diaphragm 323 also has a disk shape when viewed through a plane from a rear position to a front position.

The second fixation ring 324 is provided to fix the edge of the second diaphragm 323 to the induction plate 332. It is obvious that since the induction plate 332 comes into contact with and is supported on the housing 341, the second diaphragm 323 is ultimately supported on the housing 341 through the second fixation ring 324 and the induction plate 332.

The magnetic flux conductor 331 has an approximately 'T' shape when viewed from the front, and covers the rear surface of the first permanent magnet 311. The forward-protruding portion of the magnetic flux conductor 331 is inserted into a hole in the center of the first permanent magnet 311. A first damping hole d1 configured to adjust sound pressure behind the first diaphragm 313 is formed to pass through the center of the protruding portion in a front-rear direction, and a first damper D1 is provided behind the first damping hole d1. This magnetic flux inducer 331 induces the first magnetic flux that is generated by the first permanent magnet 311.

The induction plate 332 is provided outside the magnetic flux inducer 331, covers the rear surface of the second permanent magnet 321, and induces the second magnetic flux generated by the second permanent magnet 321.

Figure 11:
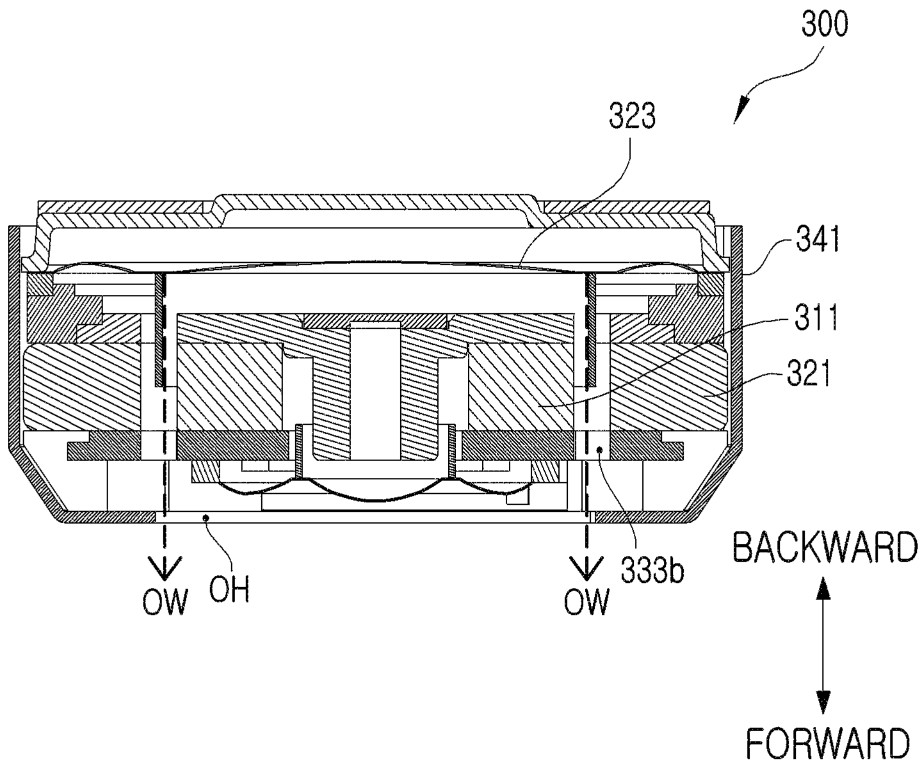
FIG. 11 is a sectional view of the earphone module taken along line II-II of FIG. 9.

The support plate 333 covers and supports the front surfaces of the first permanent magnet 311 and the second permanent magnet 321 together, and induces the first and second magnetic fluxes generated from the first permanent magnet 311 and the second permanent magnet 321. A vibration hole 333*a* is formed in the center of the support plate 333 to provide a space in which the first coil 312 can vibrate. In addition, two passage holes 333*b* through which the sound generated by the second vibration plate 323 can be passed and output forward are formed outside the vibration hole 333*a* to be symmetrically spaced apart from each other. Accordingly, as shown in the sectional view of FIG. 11 taken along line II-II of FIG. 9, output paths OW through which the second sound generated from the second diaphragm 323 is passed through the space between the first permanent magnet 311 and the second permanent magnet 321, passed through the through hole 333*b*, and then output through the sound output opening OH of the housing 341 are formed as substantially straight lines. Therefore, the phase difference between the first sound and the second sound may be minimized.

Meanwhile, the above-described magnetic flux inducer 331, induction plate 332, and support plate 333 serve to focus magnetic fluxes into the first coil 312 and the second coil 322 by inducing the magnetic fluxes of the first permanent magnet 311 and the second permanent magnet 321. To this end, all of the magnetic flux inducer 331, the induction plate 332, and the support plate 333 are made of a magnetic material.

Figure 12:
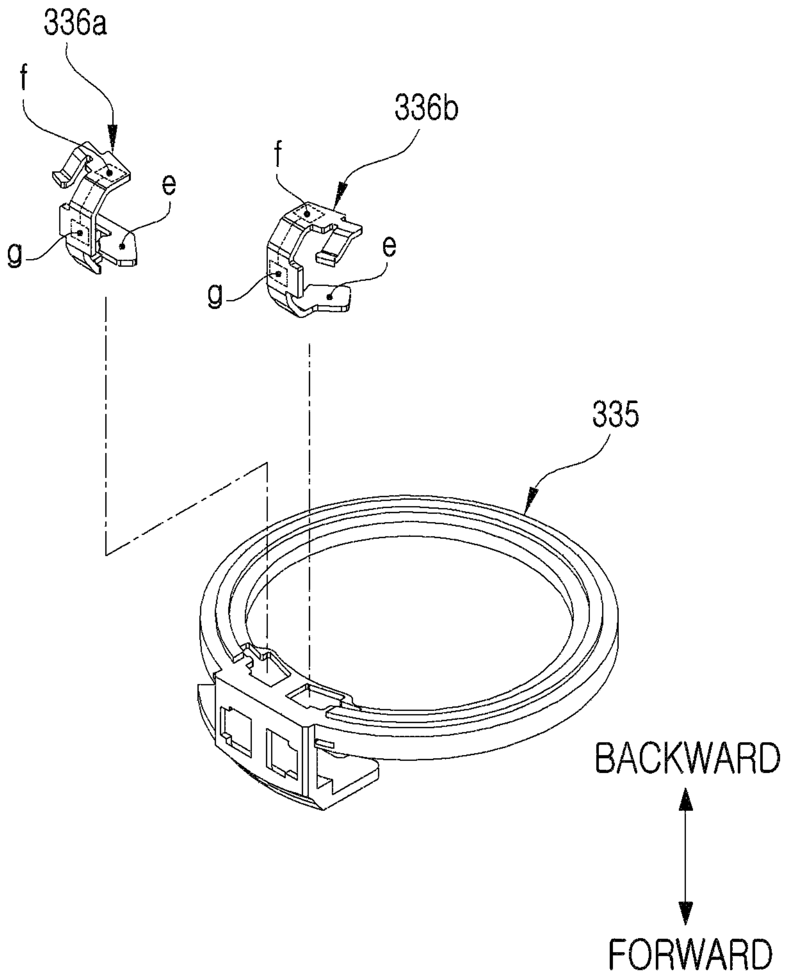
FIG. 12 is an excerpt view of a second support ring and terminal members applied to the earphone module of FIG. 9.

The second support ring 335 shown in the excerpt view of FIG. 12 is provided to support the induction plate 332 on the housing 341.

Figure 13:
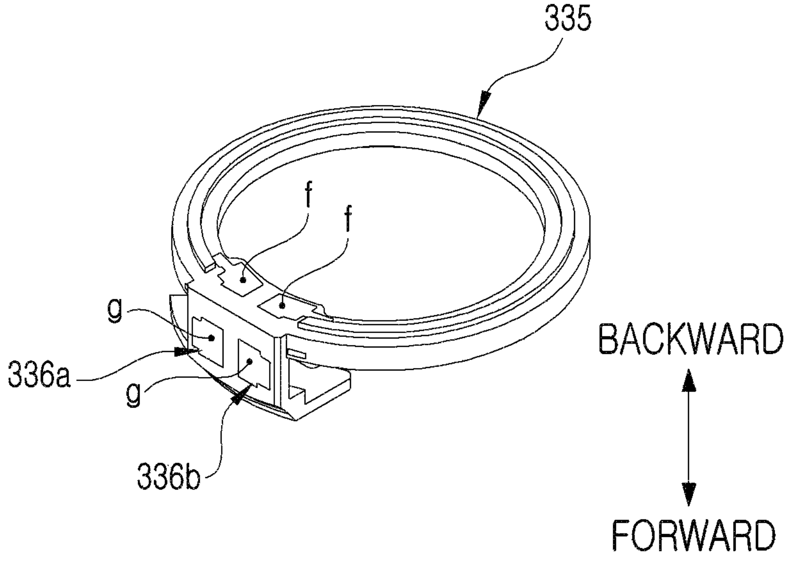
FIG. 13 is an assembled perspective view of the second support ring and the terminal members applied to the earphone module of FIG. 9.
Figure 14:
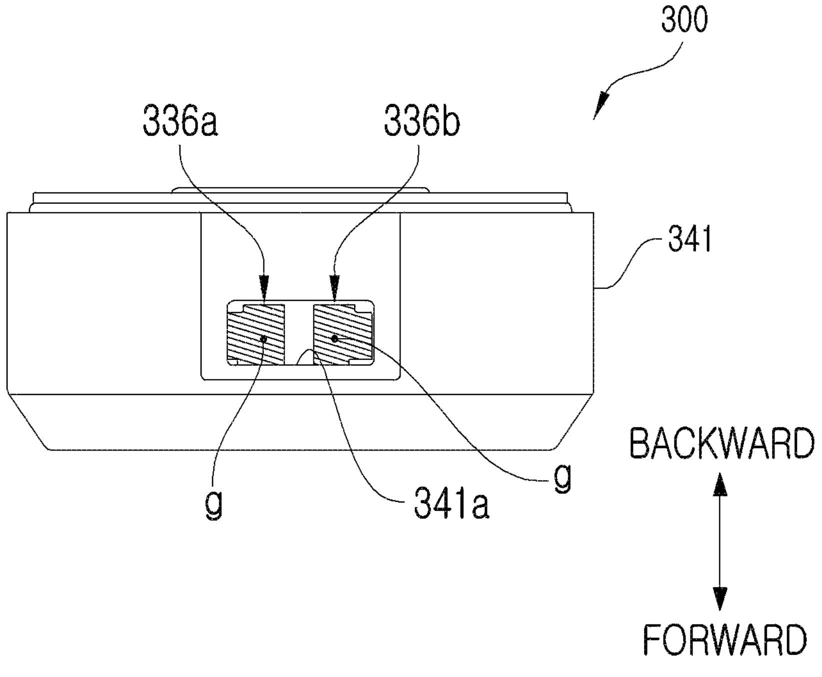
FIG. 14 is a reference view illustrating an arrangement relationship among the terminal members and the exposure window of a housing in the earphone module of FIG. 9.

The terminal members 336*a* and 336*b* are provided as a pair of first terminal members, and are respectively electrically connected to two coil wires drawn out from the first coil 312. These terminal members 336*a* and 336*b* are preferably provided to be embedded in the second support ring 335, as shown in FIG. 13. To this end, the second support ring 335 is molded through injection with the terminal members 336*a* and 336*b* are inserted thereinto. The terminal members 336*a* and 336*b* have approximate shapes bent at the centers thereof. The front ends 'e' of the terminal members 336*a* and 336*b* come into electrical contact with the first coil 312, the rear ends of the terminal members 336*a* and 336*b* come into electrical contact with the second coil 322, and the side ends 'g' of the terminal members 336*a* and 336*b* are disposed to be exposed to the outside through the exposure window 341*a* of the housing 341 as shown in FIG. 14.

The housing 341 has an accommodating space configured to accommodate all of the above-described components. The sound output opening OH through which the first and second sounds generated by the first diaphragm 313 and the second diaphragm 323 are output may be formed in the front of the housing 341, and a mount opening IH which enables the above-described components to be mounted inside the accommodation space may be formed in the rear of the housing 341. Furthermore, the exposure window 341*a* configured to expose the side ends of the terminal members 336*a* and 336*b* is formed in one side of the housing 341.

The cover 342 covers the mount opening IH of the housing 341. Second damping holes d2 configured to adjust sound pressure formed behind the second diaphragm 323 are also formed in the cover 342. A second damper D2 is attached to the rear surface of the cover 342.

When the assembly of the basic components of the earphone module 300 having the above-described basic configuration is completed, the operation of connecting to an external input circuit through the exposure window 341*a* is performed. In this case, the connection operation is the operation of connecting the external input circuit with the side ends 'g' of the terminal members 336*a* and 336*b*.

According to the present invention, after the mechanical assembly of the earphone module has been completed, an external input circuit and the coils are electrically connected by spot welding or the like from the outside through the exposure window, so that the manufacturing operation is facilitated and the defect rate is reduced, thereby improving the mass productivity.

As described above, the detailed description of the present invention has been given with reference to the embodiments taken in conjunction with the accompanying drawings, but the above-described embodiments are merely examples of the present invention. Therefore, it should not be understood that the present invention is limited only to the above-described examples, and it should be understood that the scope of the present invention should be defined based on the following claims and equivalents thereto.

What is claimed is:

1. An earphone module comprising:

a first permanent magnet configured to generate a first magnetic field adapted to reproduce a first sound in a high-pitched range;

a first coil configured to vibrate according to interference by generating a first magnetic flux adapted to interfere with the first magnetic field formed by the first permanent magnet in response to an input first electrical signal;

a first diaphragm configured to generate the first sound in the high-pitched range by vibrating together with the first coil by vibration of the first coil;

a second permanent magnet provided outside the first permanent magnet, and configured to generate a second magnetic field adapted to reproduce a second sound in a low-pitched range;

a second coil configured to vibrate according to interference by generating a second magnetic flux adapted to interfere with the second magnetic field formed by the second permanent magnet in response to an input second electrical signal;

a second diaphragm configured to generate the second sound in the low-pitched range by vibrating together with the second coil by vibration of the second coil, and disposed behind the first diaphragm;

a support plate configured to support the first permanent magnet and the second permanent magnet together, and made of a magnetic material to induce magnetic fluxes generated by the first permanent magnet and the second permanent magnet;

a housing provided with an accommodation space for accommodating the first permanent magnet, the first coil, the first diaphragm, the second permanent magnet, the second coil, the second diaphragm, and the support plate, provided with a sound output opening in a front thereof, which defines a direction in which sound is emitted, and also provided with a mount opening for enabling the first permanent magnet, the first coil, the first diaphragm, the second permanent magnet, the second coil, the second diaphragm, and the support plate to be mounted by allowing them to be accommodated in the accommodating space in a rear thereof;

a cover configured to cover the mount opening of the housing;

a pair of first terminal members connected to both lead wires of the first coil to input an electrical signal to the first coil; and a pair of second terminal members connected to both lead wires of the second coil to input an electrical signal to the second coil;

wherein the housing is provided with an exposure window for exposing the pair of first terminal members and the pair of second terminal members to an outside to connect the pair of first terminal members and the pair of second terminal members to an external electrical input circuit.

2. The earphone module of claim 1, further comprising:

a first support ring configured to support the support plate on the housing, and formed by injection molding;

a magnetic flux inducer configured to induce a magnetic flux of the first permanent magnet;

an induction plate provided outside the magnetic flux inducer, and configured to cover a rear surface of the second permanent magnet and to induce a magnetic flux of the second permanent magnet; and a second support ring configured to support the induction plate on the housing, and formed by injection molding.

3. The earphone module of claim 2, wherein:

the pair of first terminal members are coupled to the first support ring; and the pair of second terminal members are coupled to the second support ring.

4. The earphone module of claim 3, wherein:

the pair of first terminal members are coupled to the first support ring in an integrated form by insert injection; and the pair of second terminal members are coupled to the second support ring in an integrated form by insert injection.

5. An earphone module comprising:

a first permanent magnet configured to generate a first magnetic field adapted to reproduce a first sound in a high-pitched range;

a first coil configured to vibrate according to interference by generating a first magnetic flux adapted to interfere with the first magnetic field formed by the first permanent magnet in response to an input first electrical signal;

a first diaphragm configured to generate the first sound in the high-pitched range by vibrating together with the first coil by vibration of the first coil;

a second permanent magnet provided outside the first permanent magnet, and configured to generate a second magnetic field adapted to reproduce a second sound in a low-pitched range;

a second coil configured to vibrate according to interference by generating a second magnetic flux adapted to interfere with the second magnetic field formed by the second permanent magnet in response to an input second electrical signal;

a second diaphragm configured to generate the second sound in the low-pitched range by vibrating together with the second coil by vibration of the second coil, and disposed behind the first diaphragm;

a support plate configured to support the first permanent magnet and the second permanent magnet together, and made of a magnetic material to induce magnetic fluxes generated by the first permanent magnet and the second permanent magnet;

a housing provided with an accommodation space for accommodating the first permanent magnet, the first coil, the first diaphragm, the second permanent magnet, the second coil, the second diaphragm, and the support plate, provided with a sound output opening in a front thereof, which defines a direction in which sound is emitted, and also provided with a mount opening for enabling the first permanent magnet, the first coil, the first diaphragm, the second permanent magnet, the second coil, the second diaphragm, and the support plate to be mounted by allowing them to be accommodated in the accommodating space in a rear thereof;

a cover configured to cover the mount opening of the housing; and a pair of terminal members each connected to both lead wires of a corresponding one of the first coil and the second coil to input electrical signals to the first coil and the second coil;

wherein the housing is provided with an exposure window for exposing the pair of terminal members to an outside so that the pair of terminal members can be connected to an external electrical input circuit.

6. The earphone module of claim 5, further comprising:

a magnetic flux inducer configured to induce a magnetic flux of the first permanent magnet;

an induction plate provided outside the magnetic flux inducer, and configured to cover a rear surface of the second permanent magnet and to induce a magnetic flux of the second permanent magnet; and a second support ring configured to support the induction plate on the housing, and formed by injection molding.

7. The earphone module of claim 6, wherein the pair of terminal members are coupled to the second support ring.

8. The earphone module of claim 7, wherein the pair of terminal members are coupled to the second support ring in an integrated form by insert injection.

* * * * *